Reissued Nov. 1, 1932 Re. 18,642

UNITED STATES PATENT OFFICE

ALBERT C. FISCHER, OF CHICAGO, ILLINOIS, ASSIGNOR TO THE PHILIP CAREY MANUFACTURING COMPANY, A CORPORATION OF OHIO

WATERPROOF EXPANSION JOINT

No Drawing. Original No. 1,807,905, dated June 2, 1931, Serial No. 700,734, filed March 20, 1924. Application for reissue filed June 19, 1931. Serial No. 545,615.

This invention relates to a packing or filling material to be introduced between two opposed faces of a pavement, building, or other structure for the purpose of maintaining a weathertight closure of the intervening space at all times regardless of enlargement or reduction of the space consequent upon the expansion and contraction of the materials which compose the structure; the material being employed either in the form of a premolded filling slab to be introduced between the members of the structure at the time they are formed or placed in position, or in bulk form to be rendered fluid by the application of heat and poured into the opening to be waterproofed after the members of the structure are in position.

The object of the invention is to provide waterproofing joint material, or a joint member composed thereof, which will have the quality of high inherent compressibility as distinguished from mere ductility or flowing in one direction under displacement in a transverse direction; also high resiliency or capacity for returning to a dimension from which it is compressed when relieved of pressure; and to develop these inherent qualities with materials that are readily available at relatively low cost, and at least one of which is of recognized value as a waterproofing medium.

The invention proceeds upon the principle of introducing into a bituminous or asphaltic, or like material of proper consistency, a filler consisting of a material which is compressible under the forces to which the waterproofing joint will be subjected in use, and which will have sufficient resiliency when relieved of such pressure to expand the waterproofing material which envelops it, and thus not only yield to the expansion of the structural members which defined the packed space, but keep said space filled when said members contract.

An important feature of the invention consists in embedding the filling material within or surrounding it by the waterproofing material under conditions which prevent the filling material from being impregnated by the waterproofing material to a degree that would solidify the filling material and destroy its compressibility, and thereby permit use of various forms of cheap cellular or fibrous substances as the filling material; and this may be accomplished, among other ways, by previously coating the filling material with a substance that will check the inflow of the waterproofing material for at least the relatively short time that it is required to have the waterproofing material in fluid state, or by previously saturating or impregnating the filling material with a fluid that will be largely or wholly dissipated under the heat of the waterproofing material at the time of mixing, while at the same time resisting penetration of the filling material by the waterproofing material. Or the waterproofing material may be excluded from the filling material by a combination of the two methods named, to-wit: by coating with a substance that will act as a barrier to the penetration of the waterproofing material, and at the same time partially or wholly saturating or impregnating with a fluid that will become dissipated under the heat of mixing. Moreover, the impregnation of the filling material for the purpose of resisting penetration and solidification of the same by the waterproofing material may be performed under conditions which will increase the dimensions of the filling material and render it even more highly compressible and resilient, as, for instance, by using water or other vaporizable fluid to impregnate the filling material prior to its mixing with the waterproofing material, and causing this impregnating fluid to expand under the heat of mixing and inflate or puff up the filling material as the vapor escapes. The vapor escaping from the filling material may even benefit the waterproofing material by being trapped therein, causing the formation of cells or pockets.

In realizing the condition of both coating and impregnating the filling material as a barrier against penetration of the waterproofing material, sodium silicate may be employed along with a sufficient constituent of water to readily soak the filling material as the sodium silicate dries upon the surface.

The filling material preferably used in carrying out the invention is wood in shredded form, commercially known as "excelsior", or wood in the form of sawdust, or other form sufficiently subdivided to render easy and certain the complete envelopment of the subdivisions by the waterproofing material.

As a concrete example illustrative of the invention, take one hundred pounds of asphalt or other bituminous material that is approved by road engineers as a sealing substance for joints between the separately molded slabs of paving material, heat the same to about 215° F., then thoroughly mix therewith five pounds of commercial excelsior which has previously been soaked in water and thoroughly drained, or soaked in a solution of sodium silicate and permitted to dry until the sodium silicate has solidified upon the surface of the excelsior, and thoroughly mix the prepared excelsior and the softened bituminous material until the excelsior becomes thoroughly enveloped by the bituminous substance, and then introduce the resulting mixture into molds which form it into slabs corresponding to road specifications, and permit the mixture to solidify in this form, when it will be ready for shipment and use. Slabs of paving joints thus produced may, for convenience in handling and to avoid adhesion of individual slabs when packed for shipment, be faced with paper or other sheets of fabric of a nature which will not detract from the purpose of the slab when used. Slabs of the kind described will have a very high coefficient of compressibility and resiliency by reason, primarily, of the exclusion of the bituminous matter from the pores of the filling material, and also, when a sufficiently high temperature is used in mixing, because of the steaming effect of the volatile impregnating fluid upon the filler. The slabs may be employed, as is usual, in forming the divisional wall between slabs of molded pavement and will enter into water sealed relation to the opposed faces of such slabs, and will maintain such relation and adhesion thereto notwithstanding expansion and contraction of the paving slabs under changes in atmospheric temperature.

The material herein described is adapted for use in molding the joint in situ, or for patching cracks in paving material.

The filler may be mixed with the waterproofing material at a very much lower temperature than that which vaporizes the impregnating liquid, and the heat applied in fusing the packing compound at the time of pouring it into the space to be filled may be relied upon to vaporize the saturant. Or, if a coating substance be used for the filling material under conditions which do not impregnate the filling material, so that evaporation is not required, molded slabs of bituminous material with the excelsior or other compressible filling material enveloped therein, may be formed at any low temperature so long as it is sufficient to permit mixing. Alternative mixing may be accomplished by applying the bituminous matter with a solvent that is permitted to pass off with or without recovery of the solvent in bringing the composite packing material to solid form.

There is a form of asphalt known commercially, in which the asphalt is emulsified or homogenized with water so that it constitutes in effect a watery solution of asphalt which, when brought into contact with an absorbent surface, gives up its water and leaves the asphalt thereafter impervious to water. By using this compound of asphalt and water as a source of waterproofing substance, the fibrous filling material and waterproofing material can be mixed cold, and the highly absorbent nature of the fibrous material will draw from the water of the compound the necessary moisture for rendering it impervious to the asphalt as well as causing it to swell and enlarge its volume; and if the quantity of water taken up in this way is substantially less than the absorbent capacity of the fibrous material, it may or may not be driven off from the fibrous material by evaporation. Even if it be permanently trapped in the fibrous material and should freeze when the packing is in use as a road expansion joint, the resultant expansion would be a benefit rather than a detriment. Finally, packing material composed of a waterproofing bituminous substance and a filler rendered impervious to the waterproofing substance by taking up water from an aqueous compound of such waterproofing material, when mixed cold with said aqueous compound, can still be subjected to the evaporating and swelling treatment under the application of heat, for instance, by furnishing it in bulk and fusing it at the place of use preparatory to pouring it into the spaces to be filled.

The waterproofing material which is preferably used in practicing the invention herein described is what is commercially termed "blown bitumen".

I claim:

1. The process of making elastic packing material characterized by preparing a quantity of bituminous compound in a fluid condition, treating fibrous material with a substance impervious to the bituminous compound, incorporating the treated fibrous material in the bituminous compound, and solidifying the bituminous compound.

2. The process of making elastic packing material characterized by preparing a quantity of bituminous compound in a fluid condition, coating fibrous material with a substance impervious to the bituminous compound, distributing the fibrous material throughout the bituminous compound, and solidifying the bituminous compound.

3. The process of making elastic expansion joints characterized by preparing a quantity of bituminous compound in a fluid condition, treating fibrous material with sodium silicate to prevent penetration of the compound during mixing, incorporating the fibrous material in the bituminous compound, and solidifying the bituminous compound.

4. The process of making elastic expansion joints characterized by heating a quantity of bituminous material to about 215° F., mixing therewith fibrous material which has been treated with a substance to prevent penetration of waterproofing material, and molding the mixture into strips.

5. An elastic packing compound composed of a mass of bituminous material and fibrous material incorporated within the mass, said fibrous material being provided with a substance to render it impervious to the bituminous material.

6. An elastic expansion joint composed of a mass of bituminous material and porous fibrous material incorporated within the mass, said fibrous material being enveloped in a thin coating to separate same from the bituminous material.

7. An elastic expansion joint composed of a mass of bituminous material and porous fibrous material incorporated within the same, said fibrous material being enveloped in a thin coating of sodium silicate to separate same from the bituminous material.

8. An expansion joint containing a mass of bituminous material and fibrous material incorporated within the mass, said fibrous material being free from penetration by the bituminous material.

9. An expansion joint containing a mass of bituminous material and fibrous material incorporated within the mass, said fibrous material being unsaturated by the bituminous material.

Signed at Chicago, in the county of Cook, State of Illinois, this 17th day of June, 1931.

ALBERT C. FISCHER.